United States Patent
Hahn

[11] 3,797,417
[45] Mar. 19, 1974

[54] PLANTING DEVICE FOR TREE SEEDLING PLUGS

[75] Inventor: Philip F. Hahn, Eugene, Oreg.

[73] Assignee: Georgia-Pacific Corporation, Portland, Oreg.

[22] Filed: Sept. 25, 1972

[21] Appl. No.: 292,118

[52] U.S. Cl. .................................. 111/4, 111/92
[51] Int. Cl. ............................................. A01c 11/02
[58] Field of Search .......... 172/4, 92, 96, 99, 3, 22, 172/21

[56] References Cited
UNITED STATES PATENTS
| | | | |
|---|---|---|---|
| 1,870,043 | 8/1932 | Erickson | 111/4 |
| 271,507 | 1/1883 | Neblett | 111/4 |
| 1,563,625 | 12/1925 | Harry | 111/4 |

Primary Examiner—Stephen C. Pellegrino
Attorney, Agent, or Firm—Schuyler, Birch, Swindler, McKie & Beckett

[57] ABSTRACT

A manually operated tree planting device has a frame, including a base which has an aperture and is adapted to be placed against the soil, and a planting assembly that is transversely movable. The planting assembly includes a dibble and a planting tube, either of which may alternatively and selectively be aligned with the frame aperture. The dibble is first aligned with the aperture and inserted therethrough into the soil and then withdrawn to form the planting hole. Then the planting tube is aligned with the frame aperture such that a seedling may be dropped through the tube and aperture into the prepared hole.

13 Claims, 10 Drawing Figures

PATENTED MAR 19 1974  3,797,417

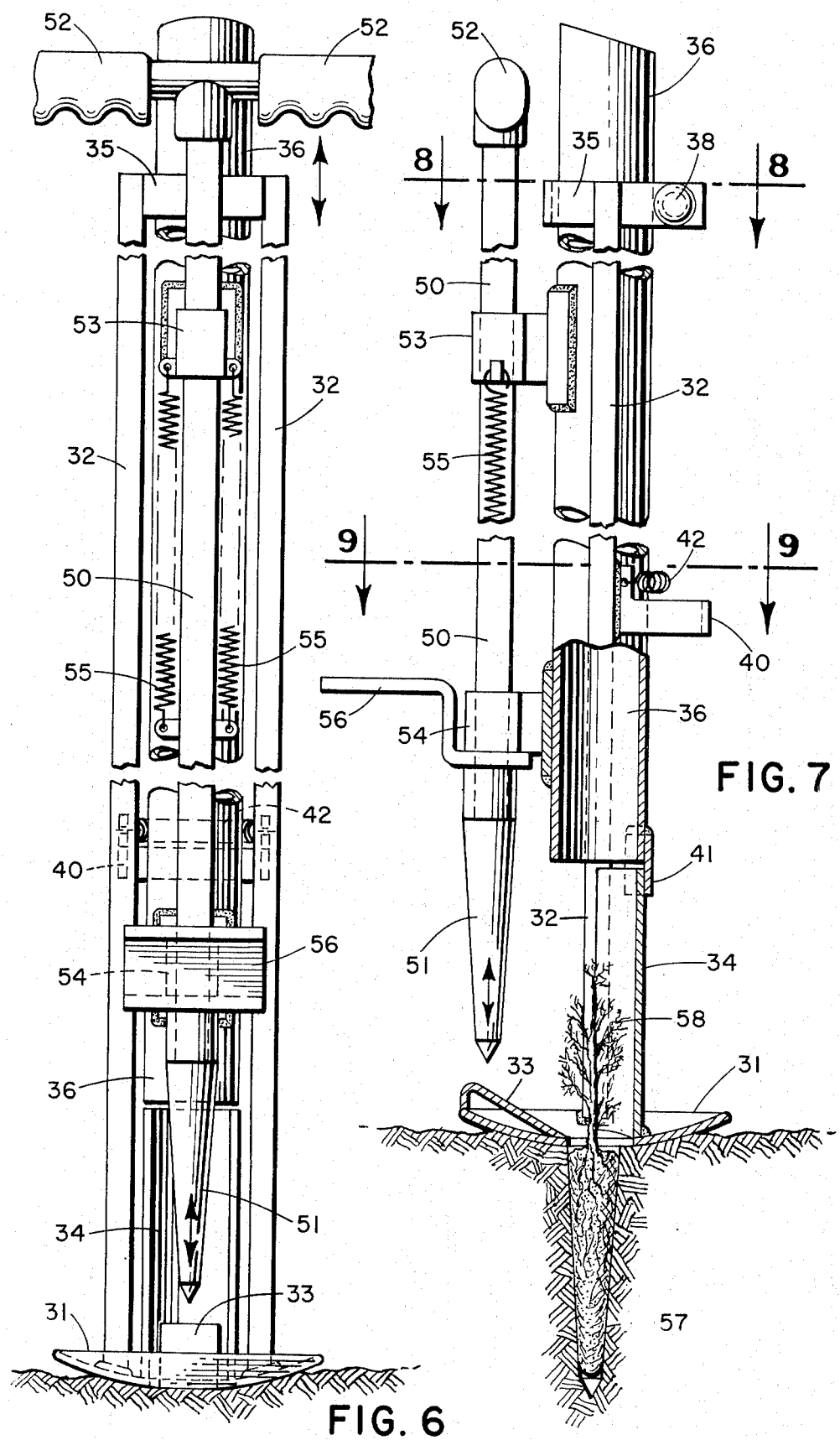

PATENTED MAR 19 1974

PLANTING DEVICE FOR TREE SEEDLING PLUGS

BACKGROUND OF THE INVENTION

The instant invention relates to a device for manual planting of tree seedlings. The device is particularly applicable to the planting of seedlings grown in containers and more particularly to seedlings grown in containers but removed from such containers prior to planting and having their root systems and growing media intact at the time of planting. However, the invention is not limited to the planting of tree seedlings and can be employed in connection with the planting of other types of plants wherein the insertion into the soil and guiding means for guiding the insertion of the item into the hole are necessary or desirable.

The prior art presents a number of devices for planting seedlings and other plants, but none have been completely satisfactory. For example, in some of the devices it is necessary to insert each individual plant into a holder or clip prior to the planting operation, thus necessitating frequent bending or stooping or frequent lifting of the entire planting device to a height accessible to the standing operator. Others of these devices have planting tubes leading to the planting hole but, to accommodate the movable dibble, the planting tubes have been angled to allow operation of the dibble. In these devices the roots of the plant entering the planting hole at an angle may strike the sides of the planting hole thus resulting in only partial entry of the plant into the hole.

In another type of prior art device the plant holder is substantially aligned with the planting location and the dibble is in a position offset from such location and is directed to the planting location during its operation by a camming surface on the planting device. However, with this type of planting device it is necessary first to prepare a planting hole by manual insertion and retraction of the dibble, then to operate a second member to lower the plant and plant holder to the planting location, and, finally, to manually operate a third member to facilitate retraction of the plant holder and the second member. Such a device is complicated, lends itself to high wear and breakage and is quite inefficient.

SUMMARY OF THE INVENTION

It is a parimary object of this invention to provide a device adapted for rapid and efficient manual planting of tree seedlings and other plants.

Another object of this invention is to provide a manual planting device which may be efficiently operated by a person standing substantially upright, without requiring lifting of the device any substantial distance from the soil, thus permitting efficient operation without excessive effort by the operator.

Briefly, the invention contemplates a device for manual planting of tree seedlings, the device having a frame with an apertured base for contacting the soil and a planting assembly connected to the frame. The planting assembly includes an elongated planting tube and an elongated dibble connected to the planting tube in parallel relation thereto and adapted move reciprocally axially and in parallel relation to the planting tube. The planting assembly is connected to the frame by means adapted to permit the dibble and the planting tube to move together in a transverse direction to selectively and alternatively align either the dibble or the planting tube with the aperture in the base. When the dibble is aligned with the base aperture, the dibble may be inserted therethrough into the soil and then withdrawn to form a planting hole. The planting tube may then be aligned with the base aperture such that an article to be planted may be dropped through the planting tube and aperture into the previously formed planting hole.

BRIEF DESCRIPTION OF THE DRAWINGS

The invention having been generally described, two specific embodiments will be discussed in detail with reference to the accompanying drawings in which:

FIG. 6 is a front view of a second embodiment of the device of this invention with the planting tube aligned with the base aperture and the dibble in its withdrawn position.

FIG. 7 is a side view of the device described in FIG. 6., partially in section, showing a tree seedling planted by means of the device.

DESCRIPTION OF PREFERRED EMBODIMENTS

Figure 1:
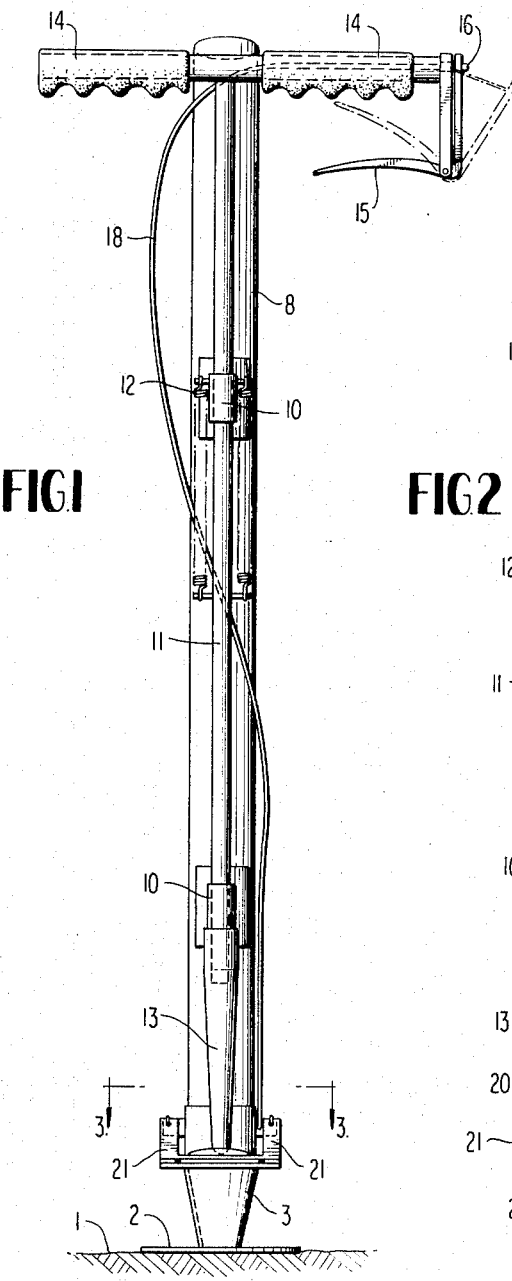
FIG. 1 is a front view of the first embodiment of the device with the planting tube aligned with the base and the dibble in its withdrawn and inoperative position.
Figure 2:
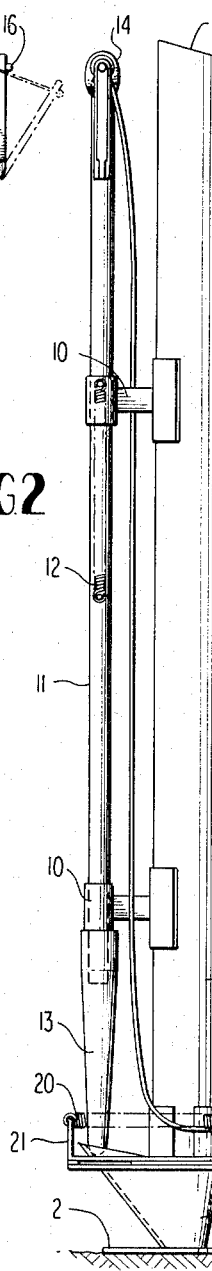
FIG. 2 is a side view of the device described in FIG. 1.

A first embodiment of the device of this invention is shown in FIGS. 1 and 2 resting against the soil. A base assembly generally comprising an apertured base plate 2 fixed to the lower end of a funnel-shaped base tube 3 contacts the soil 1 where a seedling is to be planted. Fixed to the upper end of base tube 3 of the base assembly are slide track plates 4 and 5, spaced apart by spacers 6, and forming tracks within which slide plate 7 may move transversely with respect to the base assembly. The base assembly and slide tracks comprise the frame for supporting the planting assembly of the device. The planting assembly generally comprises a planting tube 8 and a dibble assembly. This planting tube 8 is fixed to the transversely movable slide plate 7 and extends upwardly to a height placing the upper end 9 of the tube conveniently accessible to the hand of an operator standing in a substantially upright position. In FIG. 2 the planting tube 8 is shown aligned with the aperture of base plate 2.

Figure 3:
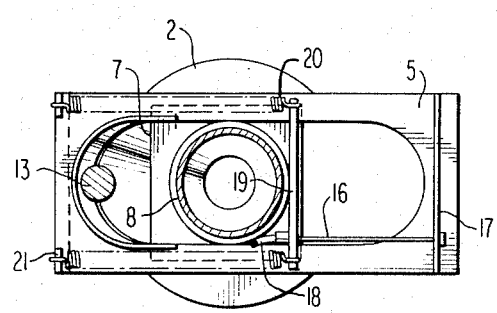
FIG. 3 is a top sectional view of the device showing a slide for transverse movement of the upper portion with respect to the lower portion of the device of FIG. 1.

Slidably attached to planting tube 8 is a dibble assembly generally comprising dibble rod 11, dibble point 13 and dibble operating handles 14. Dibble rod 11 of this dibble assembly is reciprocally slidably attached to planting tube 8 by dibble rod guide brackets 10. Dibble biasing springs 12, connected between the dibble rod 11 and the upper bracket 10, urge the dibble assembly toward the retracted position shown in FIGS. 1 and 2, in which the dibble point 13 is out of contact with the soil and above the plane of slide plate 7. Dibble rod 11 is elongated to place the dibble operating handles 14 at a height convenient for manual operation of the device by a person standing in a substantially upright position, as described below. Pivotally mounted on one of the handles 14 is control lever 15 of the slide controlling means for controlling the lateral position of the transversely movable slide plate 7. One end of control cable 16 is connected to control lever 15; the opposite end of the cable 16 is connected to cable mount bracket 17 which is fixed to slide track plate 5. The control cable 16 slides within cable sheath 18, the upper end of which is fixed to handle 14 and the lower end of which is fixed to bracket 19 on slide plate 7 (FIG. 3). One end of each of the transverse biasing springs 20 is also attached to bracket 19, the opposite end being attached to spring mounting bracket 21 which is fixed to slide track plate 5.

Figure 4:
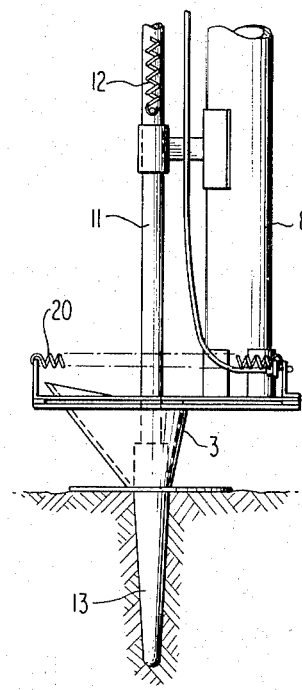
FIG. 4 is a fragmentary side view of the device of FIG. 1 with the planting tube in its offset position and the dibble aligned in its operating position and inserted through the base aperture into the soil.
Figure 5:
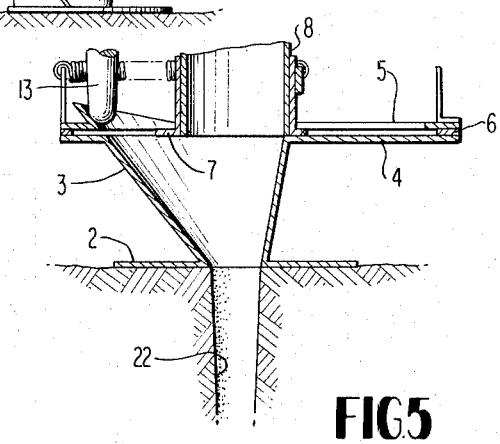
FIG. 5 is a fragmentary side view of the planting device of FIG. 1 with the planting tube aligned with the base aperture and the dibble in its retracted and inoperative position.

Control lever 15 is pivotally operable between the positions shown by the solid lines and the phantom lines in FIG. 1. With the control lever 15 in the non-operating position, as shown by the solid lines in FIG. 1, the slide plate 7 is held by the transverse biasing springs 20 in the position shown in FIGS. 2 and 5, with the planting tube 8 in alignment with the lower opening of base tube 3 and the aperture of base plate 2. When the control lever 15 is moved to its operating position, as shown by the phantom lines in FIG. 1, the resulting pull of control cable 16 through its sheath 18 causes the slide plate 7 to be pulled against the biasing springs 20 into the position shown in FIG. 4, with the planting tube 8 offset from the base tube 3 and the dibble point 13 and dibble rod 11 aligned with the aperture of base plate 2. In this operating position downward force may be applied by the operator to handles 14 and thence to the dibble rod 11 and dibble point 13, thus inserting the dibble point 13 through the base tube 3 and the aperture of base plate 2 and into the soil 1 to form a planting hole. Upon release of the downward pressure, the dibble biasing springs 12 may then return the dibble assembly to the original retracted position. Upon release of the control lever 15, and thus release of the tension exerted on control cable 16, the transverse biasing springs 20 may then return the slide plate 7 to its original position with the planting tube 8 aligned with the aperture of base plate 2 and thus aligned with the hole previously formed by dibble point 13, as shown in FIG. 5.

In operation the planting device is placed with base plate 2 resting on the soil at the location where it is desired to plant a seedling. The operator then squeezes the control lever 15 to the position shown by the phantom lines in FIG. 1, thus moving the slide plate 7, the planting tube 8 and dibble assembly into position with the dibble point 13 aligned with the aperture of base plate 2. The operator next pushes the handles 14 of the dibble assembly downwardly, inserting the dibble point 13 through the base aperture into the soil and thus forming a planting hole 22 in the soil. The operator then lifts the handles 14 to the original retracted position or permits them to be elevated by the springs 12 to that position, thus raising the dibble point 13 out of contact with the soil and to its original retracted position. Then, the operator releases the control lever 15, and the transverse biasing springs 20 return the slide plate 7, the planting tube 8 and the dibble assembly to the initial position with the planting tube 8 aligned with the aperture of base plate 2. In this position the operator may drop a seedling through the planting tube 8 and the base aperture into the prepared hole 22 in the soil. The seedling will customarily be in the form of a "plug," having been raised in a container shaped substantially similarly to the hole formed by the dibble point. These seedlings are removed from such containers prior to planting; but the growing medium, such as soil or moss, and the seedling root systems are maintained intact and provide a conveniently pointed "plug" ideally suited for insertion into a planting hole such as formed by the device of this invention.

A second and most preferred embodiment device of this invention is shown in FIGS. 6 and 7 resting against the soil. In this embodiment the frame comprises a base plate 31 having a central aperture and a convexly rounded lower surface for contacting the soil and having upright frame standards 32 attached to the base plate. A camming member 33 and a semi-circular guide member 34 are also fixed to base plate 31. At the upper end of frame standards 32 is fixed a frame mount 35 for connecting the frame to the planting assembly.

Figure 8:
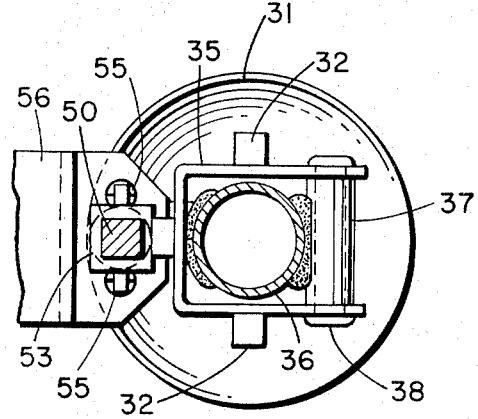
FIG. 8 is a top sectional view of the device of FIG. 7, taken along section lines 8—8.
Figure 9:
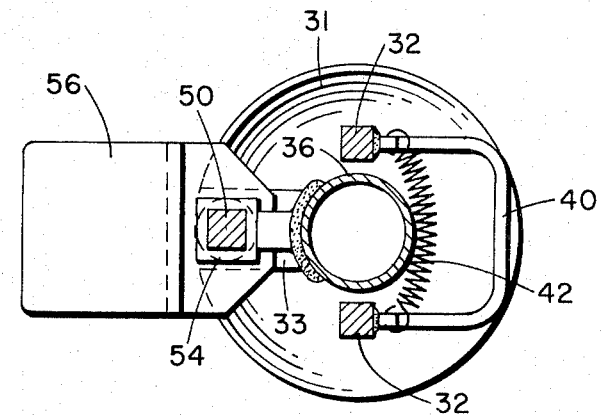
FIG. 9 is a top sectional view of the device of FIG. 7, taken along section lines 9—9.
Figure 10:
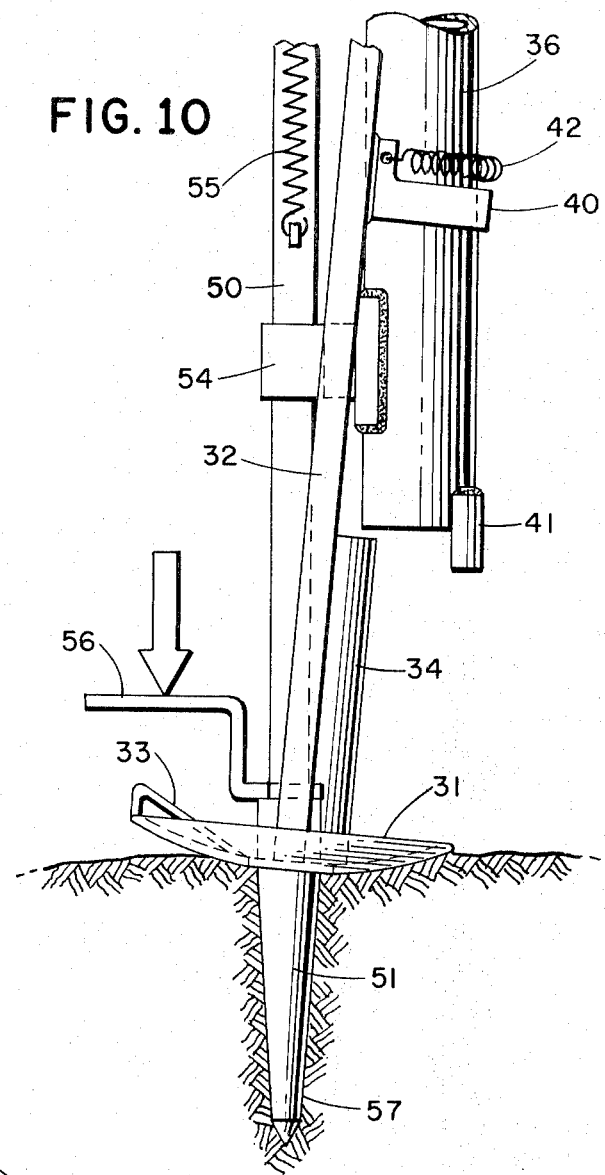
FIG. 10 is a fragmentary side view of the device of FIG. 6 with the planting tube in its offset postion and the dibble aligned in its operating position and inserted through the base aperture into the soil.

The planting assembly comprises generally the planting tube 36 and a dibble assembly. The planting tube 36 is connected to the frame by a pivotal connection to the frame mount 35. This pivotal connection comprises a sleeve 37 fixed to the planting tube 36 and a pivot pin 38 extending through mounting holes on frame mount 35 and through the sleeve 37 (FIG. 8). The frame mount 35 is sized to permit a substantial degree of free pivoting of the planting tube 36 within mount 35. As shown in FIG. 10, the extent of the relative pivoting of planting tube 36 about the pivot pin 38 in the counter-clockwise direction is limited by guide bracket 40, which is attached to frame standards 32 and which arrests the movement of the lower portion of the planting tube. The planting tube 36 is restrained in its relative pivoting in a clockwise direction by the engagement of the lip 41, which is attached to the lower extremity of the planting tube 36, with the guide member 34. When the lip 41 engages guide member 34, the planting tube 36 is aligned axially with the aperture in the base 31. Planting tube 36 is urged to this aligned position by spring 42 which is attached to the upright frame standards 32 and extends partially around planting tube 36, as shown in FIGS. 7, 9 and 10. The planting tube 36 is elongated to place the upper end of such tube conveniently accessible to the hand of an operator standing in a substantially upright position.

Slidably attached to planting tube 36 is a dibble assembly generally comprising dibble rod 50, dibble point 51 and dibble operating handles 52. Dibble rod 50 of this assembly is reciprocally slidably attached to planting tube 36 by dibble rod guide brackets 53 and 54. Dibble biasing springs 55, connected between dibble rod 50 and dibble rod guide bracket 53, urge the dibble assembly toward the retracted position shown in FIGS. 6 and 7, in which the dibble point 51 is out of contact with the soil and above the base plate 31. Dibble rod 50 is elongated to place the dibble operating handles 52 at a height convenient for manual operation of the device by a person standing in a substantially upright position, as described below. A foot pedal 56 is attached to the lower portion of the dibble rod below lower guide bracket 54 such that foot pressure may be applied to assist in the insertion of dibble point 51 into the soil.

In operation the planting device of this second embodiment is placed with the base plate 31 resting on the soil at the location where it is desired to plant a seedling. The operator then pushes the handles 52 (and, if desired, the foot pedal 56) of the dibble assembly downwardly, thus creating a pivoting moment about the pivot pin 38 by virtue of the displacement of the downward force a distance from such pivot point 38. Thi pivoting moment causes the planting assembly to pivot relatively about pin 38 until planting tube 36 engages guide bracket 40. With this pivoting movement caused by the substantially vertically downward force on the dibble assembly the planting device frame with its convexly curved base is caused to tilt slightly, such that the planting assembly moves transversely from its initial position to its pivoted position but retains its substantially vertical orientation, as shown in FIG. 10. In this pivoted and transversely moved configuration the dibble point 51 is brought into alignment with the aperture of the base plate 31. Further downward force on the dibble assembly then overcomes the resistance of dibble biasing springs 55 and causes the dibble assembly to move downwardly, thus inserting the dibble point through the base plate aperture and into the soil to form a planting hole 57, also as shown in FIG. 10. The operator then lifts the handles 52 to the original retracted position or permits them to be elevated by the springs 55 to that position, thus raising the dibble point 51 out of contact with the soil and to its original retracted position. Upon release of the downward pressure the planting assembly biasing spring 42 will urge the planting assembly back to its original position with the planting tube 36 aligned with the base aperture. In this position the operator may drop a seedling 58 through the planting tube 36 and the base aperture into the prepared hole 57 in the soil, as shown in FIG. 7. As described for the previous embodiment, the seedling will customarily be in the form of a shaped plug to facilitate planting into the formed hole. It should be noted, however, that the device of this invention would function suitably with plants of other types which may or may not include a root system and soil mass formed into a shaped plug.

The foregoing is considered as illustrative only of the principles of the invention. Further, since numerous modifications and changes will readily occur to those skilled in the art, it is not desired to limit the invention to the exact construction and operations shown and described. Accordingly, all suitable modifications and equivalents following within the scope of the invention may be included.

What is claimed is:

1. A planting device comprising
    a frame having a base with an aperture therein for contacting the soil;
    a planting assembly connected to said frame, said planting assembly comprising
        an elongated planting tube means,
        an elongated dibble means, and
        dibble connecting means connecting said dibble means in parallel relation to said tube means and further including means for providing movement of the dibble means reciprocally axially and in parallel relation to said tube means; and
    planting assembly connecting means connecting said planting assembly to said frame, said planting assembly connecting means permitting said dibble means and said tube means to move together in a transverse direction to selectively and alternatively align either said dibble means or said planting tube means with the aperture in said base, whereby said dibble means may be aligned with said aperture and inserted therethrough and withdrawn to form a planting hole in said soil, and then said planting tube means may be aligned with said aperture such that an article to be planted may be dropped through said aligned tube and base aperture into said planting hole.

2. A planting device according to claim 1 wherein said dibble means and said planting tube means extend upwardly to a position to enable the use thereof by a person standing substantially upright.

3. A planting device according to claim 1 further comprising means attached to said frame biasing said planting tube means toward a position substantially in alignment with said base aperture.

4. A planting device according to claim 1 further comprising means attached to said frame biasing said dibble means toward a position out of penetration with said soil.

5. A planting device according to claim 1 wherein said planting assembly is slidably connected to said base by a horizontal track means.

6. A planting device according to claim 1 wherein said planting assembly is pivotally connected to said frame.

7. A planting device according to claim 6 wherein said pivotal connection is adjacent the end of said planting tube distal from said base, whereby said transverse movement may be effected by pivoting movement about said connection and lateral movement of the frame portion adjacent said connection.

8. A planting device according to claim 7 wherein said pivotal connection is positioned on the side of said planting tube opposite said dibble.

9. A planting device according to claim 6 wherein said frame comprises an elongated upright standard, said planting assembly is pivotally hung from the upper end of said standard whereby said lateral movement of said planting assembly is accompanied by a tilting movement of said frame.

10. A planting device according to claim 9 wherein said base has a rounded bottom to facilitate said tilting movement.

11. A planting device comprising:
    a frame having a base with an aperture therein for contacting the soil;
    an elongated dibble means movably attached to said frame by dibble mounting means providing for movement of said dibble means with respect to said frame between an inoperative position laterally offset from said aperture and an operating position in alignment with said aperture, said dibble mounting means also providing for movement of said dibble means vertically along the axis of said aperture when in said operating position, whereby said dibble means may be moved through said aperture to penetrate the soil and form a planting hole therein, said dibble means extending upwardly to a position to be operated manually by a person standing substantially upright; and an elongated, substantially vertical planting tube means movably attached to said frame by tube mounting means providing for transverse movement of said planting tube means, with respect to said frame, between a planting position substantially in alignment with said base aperture so that an article to be planted may be directed along a vertical path through said planting tube means and said aperture to said planting hole, and an offset position wherein said planting tube means is laterally offset from said aperture, said planting tube means extending upwardly to a position to enable the placing therein of an article to be planted by a person standing in a substantially upright position.

12. A planting device according to claim 11 further comprising means interconnecting said dibble means and said planting tube means for coordinating the movement of said dibble means and said planting tube means between said positions, such that when said dibble means is in said inoperative position, said planting tube means is in said planting position, and when said dibble means is in said operating position, said planting tube means is in said offset position.

13. A planting device according to claim 12 wherein said interconnecting means comprise bracket means attached to said planting tube means and supporting said dibble means for reciprocating movement.

* * * * *